United States Patent
Meng et al.

(10) Patent No.: US 10,278,238 B2
(45) Date of Patent: Apr. 30, 2019

(54) COOKTOP

(71) Applicant: BREVILLE PTY LIMITED, Alexandria, New South Wales (AU)

(72) Inventors: Lichan Meng, Randwick (AU); Marian Silviu Rosian, Forestville (AU); Richard Hoare, Lane Cove (AU); Brendan John Foxlee, Earlwood (AU); Vyvyan Rose, Bronte (AU); David Davenport, Lane Cove (AU); Tibor Hegedis, Rosebery (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 103 days.

(21) Appl. No.: 15/523,676

(22) PCT Filed: Nov. 2, 2015

(86) PCT No.: PCT/AU2015/000657
§ 371 (c)(1),
(2) Date: May 2, 2017

(87) PCT Pub. No.: WO2016/070220
PCT Pub. Date: May 12, 2016

(65) Prior Publication Data
US 2017/0339751 A1 Nov. 23, 2017

(30) Foreign Application Priority Data
Nov. 7, 2014 (AU) .............................. 2014904483

(51) Int. Cl.
*H05B 1/02* (2006.01)
*F24C 7/08* (2006.01)
(Continued)

(52) U.S. Cl.
CPC ........... *H05B 6/062* (2013.01); *H05B 1/0266* (2013.01); *H05B 2213/07* (2013.01)

(58) Field of Classification Search
CPC ... H05B 1/0266; H05B 6/062; H05B 2213/07
(Continued)

(56) References Cited

U.S. PATENT DOCUMENTS

| 2,727,975 A | 12/1955 | Molyneaux et al. |
| 4,812,624 A | 3/1989 | Kern |

(Continued)

FOREIGN PATENT DOCUMENTS

| EP | 1037508 A1 | 9/2000 |
| EP | 1688721 A1 | 8/2006 |

(Continued)

OTHER PUBLICATIONS

International Search Report and Written Opinion for PCT/AU2015/000657, dated Jan. 15, 2016.

(Continued)

*Primary Examiner* — Quang T Van
(74) *Attorney, Agent, or Firm* — Marshall, Gerstein & Borun LLP

(57) ABSTRACT

A cooktop appliance apparatus for use in cooking. The appliance including a controller for controlling operation of the fan system based on an average power level supplied to a heating system, and based on a temperature measure associated with the one or more subsystems. The appliance including a hardware-implemented safety module comprising two or more temperature actuated safety circuits. The appliance including a user interface adapted to receive a user input with respect to operating parameters of the heating system, the user input including a heating control mode and a set temperature. The appliance including a controller adapted to identify a cooking vessel on an induction cooktop.

15 Claims, 15 Drawing Sheets

(51) Int. Cl.
*H05B 6/06* (2006.01)
*H05B 6/80* (2006.01)

(58) Field of Classification Search
USPC ....... 219/627, 411, 412, 413, 414, 440, 441,
219/442, 443, 445, 446, 448, 44, 9, 450,
219/481, 491, 492, 494, 497, 501, 502,
219/506, 714, 715, 720; 99/325;
126/39 R; 323/234
See application file for complete search history.

(56) References Cited

U.S. PATENT DOCUMENTS

| | | | | |
|---|---|---|---|---|
| 6,080,972 A | * | 6/2000 | May | A21B 1/02 219/486 |
| 6,809,301 B1 | * | 10/2004 | McIntyre | F24C 7/082 219/492 |
| 2004/0149736 A1 | | 8/2004 | Clothier | |

FOREIGN PATENT DOCUMENTS

| | | |
|---|---|---|
| JP | 2004047305 A | 2/2004 |
| JP | 2004111090 A | 4/2004 |
| WO | WO-2012/006674 A1 | 1/2012 |

OTHER PUBLICATIONS

International Preliminary Report on Patentability for PCT/AU2015/000657, dated May 9, 2017.
Extended European Search Report for European Patent Applicatoin No. 15857997.9, dated Jun. 8, 2018.

* cited by examiner

COOKTOP

FIELD OF THE INVENTION

The present disclosure relates to cooktops. In one form the present disclosure relates to induction cooktops.

BACKGROUND OF THE INVENTION

In cooktops, such as induction cooktops, control mechanisms are used both to ensure the proper functioning of the cooktop as well as to ensure the operational safety of the cooktop. For example, if a low, medium or high heat setting is selected, a typical cooktop will include operation mechanisms to ensure that the cooktop surface reaches, and is maintained, within a certain temperature range for each of these respective settings. Also, to prevent overheating (for example in the case of a malfunction) cooktops typically include overheating protection in the form of a fuse that will disable the heating system in the event that an unusually high temperature is detected.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

Described herein are methods and systems for controlling various aspects of the operation of a cooktop, in particular a portable induction cooktop. In some aspects, the methods and systems described herein relate to the operation of a cooktop to reach and maintain cooking temperatures (and temperature profiles) provided by the cooking surface. In other aspects, the methods and systems described herein relate to safety features of a cooktop, including the regulation of heat internally, the prevention of overheating of various components of the cooktop, and the detection of cooking vessels placed on the surface of an induction cooktop.

In one aspect there is provided a cooktop appliance comprising a heating system associated with a cooking surface; a controller for controlling operation of the heating system; and a user interface adapted to receive a user input with respect to operating parameters of the heating system, the user input comprising a set temperature; wherein the controller controls operation of the heating system based on one or more heating control modes and the set temperature. The one or more heating control modes determine how the heating system achieves the set temperature, for example how fast the set temperature is reached and/or to which degree temperature overshoot is avoided.

Each of the one or more heating control modes may be associated with a temperature range and/or a power range. The one or more control modes may be default and/or user selected modes. The temperature range may be a default or a user selected temperature range. The power range may be a default or a user selected power range. The power range may be associated with a rate of temperature change. The power range may be a fraction of a maximum appliance power limit. The heating system may be an induction coil.

The user input may further comprise one of a group consisting of a power range and a rate of temperature change. The one or more heating control modes may then further be based on the power range or the rate of temperature change. The cooktop appliance may further comprise one or more temperature sensors for providing temperature measurements to the controller for use in the controlling. The one or more temperature sensors may include a surface temperature sensor and/or a probe sensor.

In another aspect there is provided a cooktop appliance comprising a heating system for heating a cooking vessel containing a food substance; a temperature sensor adapted to measure a temperature associated with the cooking vessel; and a controller for controlling operation of the heating system, wherein the controller is adapted to control the heating system so as to provide a heating profile comprising two or more heating stages, wherein a transition from one stage to a next stage is based on a measured rate of temperature change of the cooking vessel and/or the food substance, and wherein the controller controls the heating system based on the measured temperature.

In another aspect there is provided a cooktop appliance comprising a heating system; a temperature sensor adapted to measure a temperature associated with the heating system; and a processor associated with memory and comprising controller for controlling operation of the heating system based on the measured temperature; wherein the controller is adapted to control the heating system so as to provide a cooking sequence comprising one or more heating stages, each heating stage associated with a set temperature, a rate of temperature change and a duration. The cooking sequence may be stored on the memory for subsequent recall and execution.

In another aspect there is provided a cooktop appliance comprising a fan system for cooling one or more appliance subsystems; and a controller for controlling operation of the fan system; wherein the controller controls the fan system based on an average power level supplied to a heating system, and based on a temperature measure associated with the one or more appliance subsystems.

The one or more appliance subsystems may comprise a heating system of the cooktop appliance and/or electronic circuitry of the cooktop appliance.

A range of the average power level supplied to the heating system may be mapped to a first range of fan speeds according to a first mapping, and a range of appliance subsystem temperatures may be mapped to a second range of fan speeds according to a second mapping. The controller may control the fan system by selecting a fan speed according to a highest fan speed resulting from the first mapping and the second mapping.

In another aspect there is provided a hardware-implemented cooktop appliance safety system comprising two or more safety circuits, each safety circuit comprising a temperature sensor adapted to sense a temperature associated with a heating system of the cooktop appliance; a comparator adapted to compare the sensed temperature with a threshold safety temperature; and an actuator for activating operation of the heating system in cooperation with actuators of the other one or more safety circuits in the safety system so that operation of the heating system occurs when each of the two or more safety circuits determine that the sensed temperature is below the threshold safety temperature. The safety system may be electrically isolated from circuitry driving the heating system. The temperature sensors of the two or more safety circuits may be the same temperature sensors used in the control of the heating system.

In another aspect there is provided a method of detecting a cooking vessel on an induction cooktop comprising providing an on/off power cycle; detecting a current resulting from on cycles; and comparing the detected current with a threshold current to determine the presence of a cooking vessel; wherein each on cycle has a duration of one time interval, and the off cycles have respective durations of multiples of one time interval. The value of the multiple of one time interval associated with each off cycle may be based on an associated heating duration and an associated target temperature.

The method of detecting a cooking vessel may further include receiving a position indication from a position sensor indicative of movement of a temperature sensor assembly being depressed, for example by a cooking vessel places on the cooktop. The position sensor may have a dual sensor offset configuration providing a position indication that includes indications relating to two different positions.

The method of detecting a cooking vessel may determine the presence of a cooking vessel based on a combination of on/off power cycling and the received position indication(s).

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

A preferred embodiment of the invention will now be described, by way of example only, with reference to the accompanying drawings in which.

DETAILED DESCRIPTION OF THE EMBODIMENTS

A number of features that relate to the control of cooktops are described herein. It will be understood that some of these features are relevant to cooktop appliances generally, even though the embodiments described below relate specifically to induction cookers.

Figure 1:
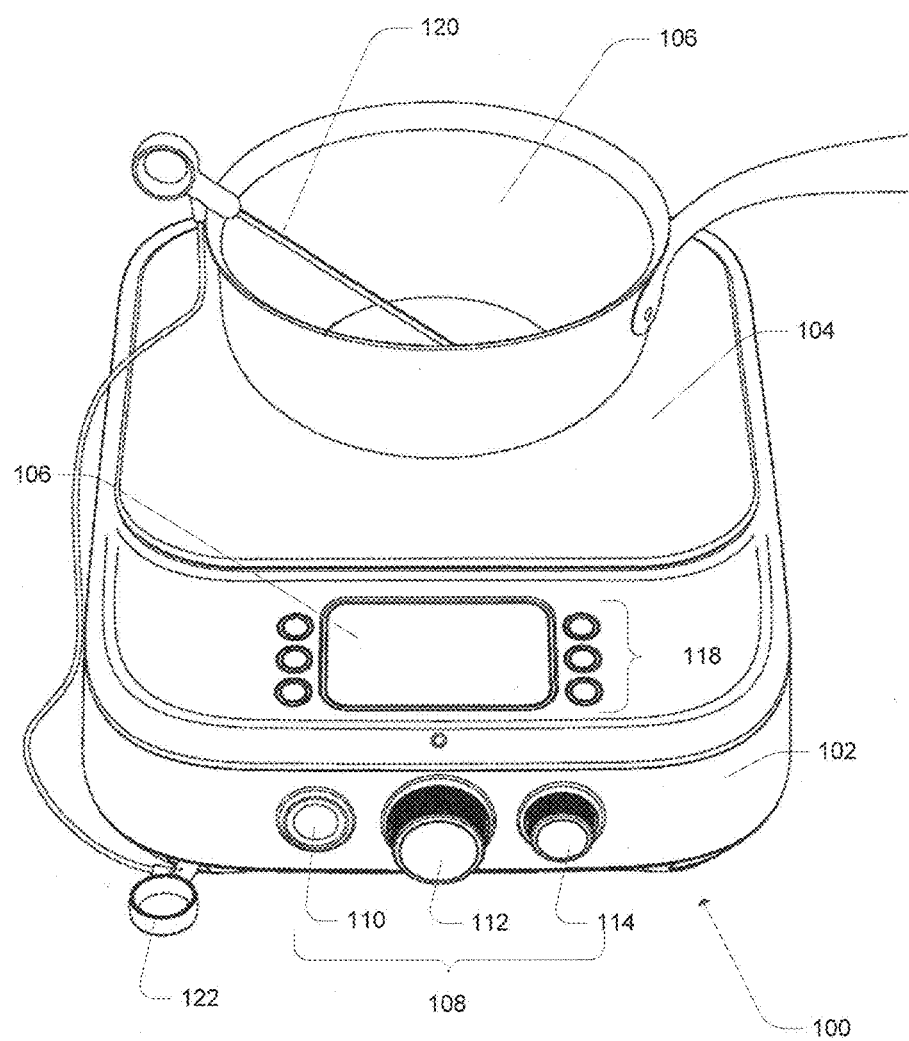
FIG. 1 is a perspective view of a portable induction cooker.

FIG. 1 shows an induction cooker 100 that has a base 102 supporting a cooktop surface 104 on which a cooking vessel rests, shown here as a saucepan 106. The cooker has a user interface 108 which includes an on/off power button 110 and two dials 112, 114 on the front surface of the base 102, and a display 116 flanked by a number of push buttons 118 on the top surface of the base 102 in front of the cooktop surface 104. The various components of the user interface 108 are used a) to receive simple user inputs for operating parameters, such as a set temperature and a rate of temperature change (also referred to as "heating speed"), b) to set up or select compound user inputs, such as cooking profiles and sequences (described in more detail elsewhere herein), and c) to display information to the user, such as cooking status or menu functions. The rate of temperature change is associated with the power used in operating the heating system, so that a user-selected operating parameter may also be provided with respect to a maximum power or power range.

The induction cooker 100 includes a number of sensors that contribute to the operation of the cooker 100. A surface temperature sensor situated approximately in the middle of the cooktop surface 104 (hidden beneath the saucepan 106 in FIG. 1) is used to detect the temperature of the base of the cooking vessel used for cooking, such as the saucepan 106 shown. In some embodiments two or more surface temperature sensors may be used, distributed over the cooktop surface 104. A temperature probe 120, connected to the cooker 100 via a connector 122 plugged into a receiving port in the base 102, provides an additional measured temperature of a food substance in the cooking vessel being heated. Embodiments of the receiving port and temperature probe are described in Australian provisional application 2014902393 (filed 23 Jun. 2014), incorporated herein by reference.

In some embodiments the temperature probe 120 has one NTC sensor at the end of the probe. In other embodiments, the temperature probe 120 includes two or more NTC sensors at the end of the probe and/or spaced along the shaft of the probe. In some embodiments where the temperature probe 120 includes two or more NTC sensors, NTC sensors with different temperature sensitivities and/or response profiles are used to improve the accuracy of the probe temperature reading.

Figure 2:
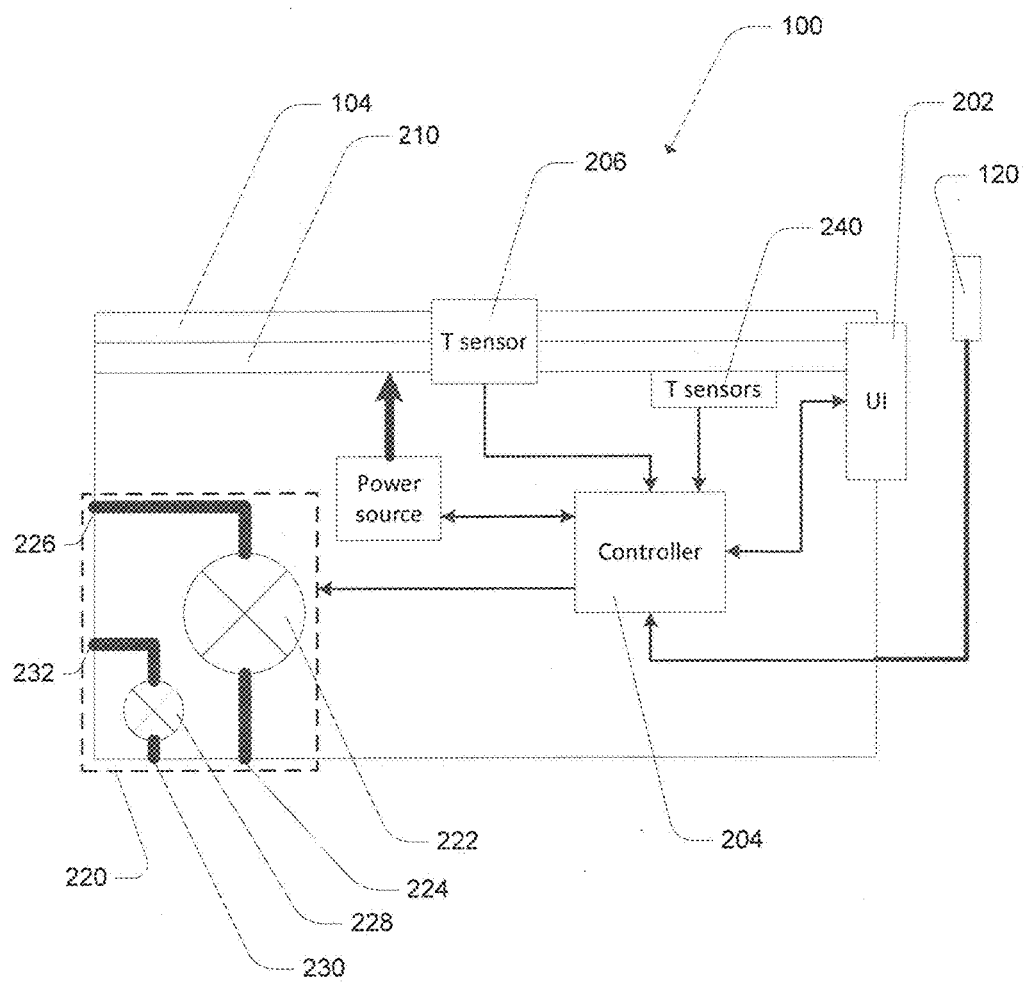
FIG. 2 is a schematic representation of the induction cooker of FIG. 1.

FIG. 2 is a schematic representation of the induction cooker 100 of FIG. 1. The cooker 100 has a controller 204 that receives data from a user interface (UI) 202 as well as from a number of sensors in the cooker 100. The controller 204 controls the operation of the subsystems of the cooker 100. The controller 204 is implemented on a processor (such as a microprocessor, microcontroller, DSP, FPGA or similar), the processor connected to memory, and having I/O interfacing. Functionally, the controller 204 includes various control subsystems for controlling various features of the cooker, such as (but not limited to) a temperature controller for the heating system, a coil fan controller, and an electronics fan controller. These control subsystems are described in more detail elsewhere herein.

The controller 204 receives user inputs from the user interface 202 that include, for example, a cooking temperature, a rate of temperature change and/or a time to cook. Rate of temperature change (or "heating speed") is described in more detail in International Patent Application WO2012/006674 incorporated herein by reference. In addition, the user can provide a sequence of cooking instructions via the user interface, for example two or more sequenced combinations of a cooking temperature, rate of temperature change, and/or time to cook (i.e. the duration of one or more cooking stages).

The controller 204 also receives input signals from a number of sensors. These sensors include, and are not limited to, one or more temperature sensors. Shown in FIG. 2, the temperature sensors in this embodiment include a surface temperature sensor 206 that extends through the cooktop surface 104 and is adapted to abut and measure the temperature of a bottom surface of a cooking vessel resting on the cooker 100. The temperature sensors also include an external probe temperature sensor 120 as shown in FIG. 1. One or more temperature sensors 240 provide additional temperature measurements, for example sensors associated with the electronics (e.g. a heat sink temperature associated with one or more power switches), and temperature measurements associated with the heating system (e.g. an induction coil or the cooktop surface itself).

The controller 204 also receives one or more inputs from the power source 208 of the cooker 100 indicative of the operation of the power source, for example a current indication, a voltage indication, and/or a power indication, one or more of these indicative of the operation and state of the cooker 100. For example, if high power is provided to the heating system, in this case an induction coil 210, for the provision of rapid heating and/or a high steady state temperature, this may result in a high current indication being provided to the controller 204. The controller 204 uses the current indication as a predictor for the temperature state of cooktop components such as the cooker's internal electronics. If high current is drawn, then it is an indication that the internal electronics may heat up, and therefore this measurement may be used in the control of the cooker's fan assembly.

In cooktops that do not use an induction coil, the heating system may include a conventional heating element.

One or more fans may be included. In this embodiment, the fan assembly 220 includes a coil fan 222 with coil ingress air path 224 and a coil egress air path 226, and an electronics fan 228 with an electronics ingress air path 230 and an electronics egress air path 232.

1. Operation of the Induction Cooker
1.1 Temperature Profiles: Temperature Setting and Rate of Temperature Change On current cooktops of any power source (e.g. gas, electric or induction) there is limited control of the actual temperature within the cooking vessel to be heated. Usually only the energy input can be controlled, with typical settings being "low", "medium" and "high", or an arbitrary heating range, e.g. from 1-10 (low to high). The actual pan or pot temperature is relative to the applied power and the load in the pan or pot. One consequence of this is that over-cooking can easily occur because the exact temperature is unknown, even when using low cooking temperatures.

Low cooking temperatures are often used for food that is quite sensitive to temperature. For example milk and eggs have complex proteins that denature at low temperatures and require slow transformation to control the cooking process to avoid over cooking. On the other hand, frying and searing require high heat, and such cooking styles also generally require the pan to return to a high temperature quickly if more ingredients are added. Therefore, the way the set temperature needs to be reached may differ for different uses, foods, recipes or for low and high set temperatures.

Figure 3:
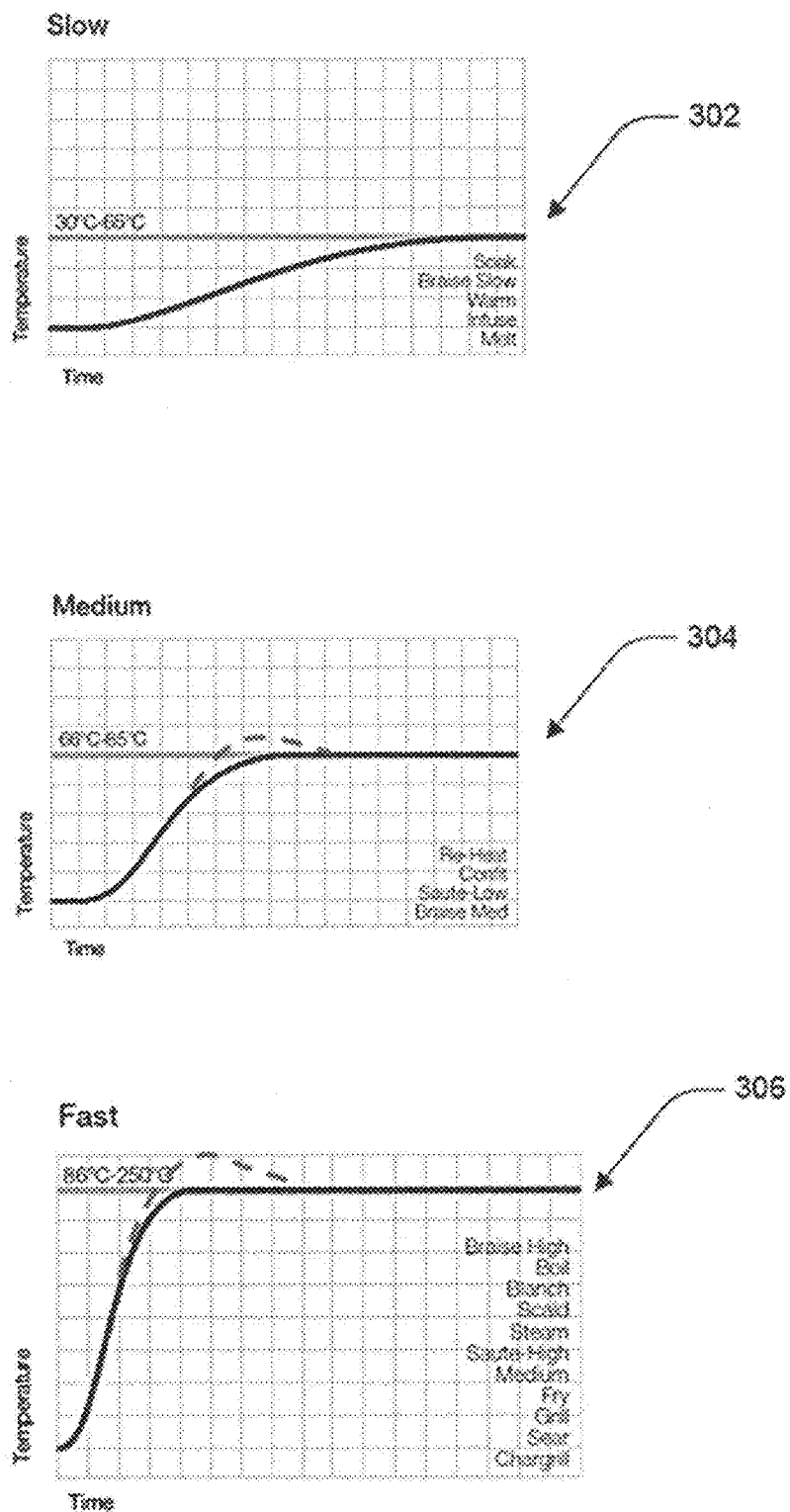
FIG. 3 is a graphic representation of the rate of temperature change for different set temperatures required for different cooking styles.

Different heating speeds may be associated with different temperatures according to different styles of cooking, as can be seen in FIG. 3. For cooking styles utilising low temperatures (e.g. 30-65 degrees Celsius), the slow heating profile 302 shows a slow increase in temperature (e.g. over 5-8 minutes). Cooking styles utilising medium temperatures (e.g. 66-85 degrees Celsius) are associated with a medium rate of temperature change (e.g. 3-4 minutes) as illustrated by the medium heating profile 304. Cooking styles utilising high temperatures (e.g. 86-250 degrees Celsius) are associated with a faster rate of temperature change (e.g. 1-2 minutes) as illustrated by the fast heating profile 306.

The example described here as three power ranges. In other embodiments, any useful number of power ranges may be applied, for example 2 (a low power for slow heating and a high power for fast heating), or 4 or more. In other embodiments power ranges (where the power of each range is capped at a different maximum power) may not be used, and the maximum appliance power (or selected maximum power) is always used (or generally used as a default) so that the equivalent of a single power range is used.

Temperature Setting and the Default Rate of Temperature Change

In one embodiment heating and power settings for the induction cooker are designed with a default heating process according to the maximum rate of temperature change, which is achieved by applying the appliance maximum power (e.g. 1800 Watt).

In another embodiment the heating and power settings are designed with a default heating process that includes the following temperature and power combinations:

(a) A low set temperature (e.g. below 80 degrees, for example 50 degrees and less) is reached slowly to avoid temperature overshoot, so that sensitive foods (e.g. eggs or milk) do not overheat or burn if the food is in the pan or pot during the heating process. The maximum power supplied to the heating system is capped at a fraction of the maximum appliance power limit, e.g. ⅕, ¼, ⅓ or ½ the maximum power. In Australia the maximum power is 2400 W, so that a power cap of, for example, ¼ will cap the power at 600 W. Similarly, in the US where the maximum power is 1800 W, a ⅓ power cap will cap the power at 600 W.

(b) A medium set temperature (e.g. 50-120 degrees, or 50-80 degrees) is reached at a medium speed, resulting in a moderate temperature overshoot. The maximum power supplied to the heating system is capped at, e.g. ½ or ⅔ the maximum power.

(c) A high set temperature (e.g. 80-120 degrees or higher) is reached at a fast rate of temperature change which may result in a large temperature overshoot. The type of food that is prepared at such a high temperature (e.g. food being fried or sautéed) can often withstand this kind of temperature overshoot, and the advantage of a pan heated quickly is attained through use of the fast rate of temperature change. For these temperature settings, the maximum power supplied to the heating system is capped at, e.g. ¾ or 80% of the maximum power, or the maximum power supplied may not be capped at all.

For embodiments that use one or more temperature and power combinations (for example as described above, an additional setting may be used for a maximum rate of temperature change, in which the power supplied to the heating system is not capped, in which case the set temperature is reached as fast as possible despite the resulting temperature overshoot. The maximum rate of temperature change setting may then be used as default for very high temperatures (e.g. above 120 degrees), or may be reserved for an optional user activated heating mode.

The selection of temperature ranges as associated with certain power limits may be linearly or nonlinearly mapped:
 (a) For a linear mapping, for example, ½ maximum temperature is mapped to ½ maximum power, and ¾ maximum temperature is mapped to ¾ maximum power.
 (b) For a nonlinear mapping, the example mapping shown in Table 1 below may be used.

TABLE 1

Example nonlinear temperature range to maximum power mapping

| | Temperature range [degrees Celsius] | | | |
|---|---|---|---|---|
| | T < 50 | 50 < T < 80 | 80 < T < 120 | 120 < T < 250 |
| Maximum power [Watt] | 600 | 1200 | 1800 | 1800 |

The mapping may be a continuous mapping, or may be step-wise as shown for the embodiments described herein.

Figure 4:
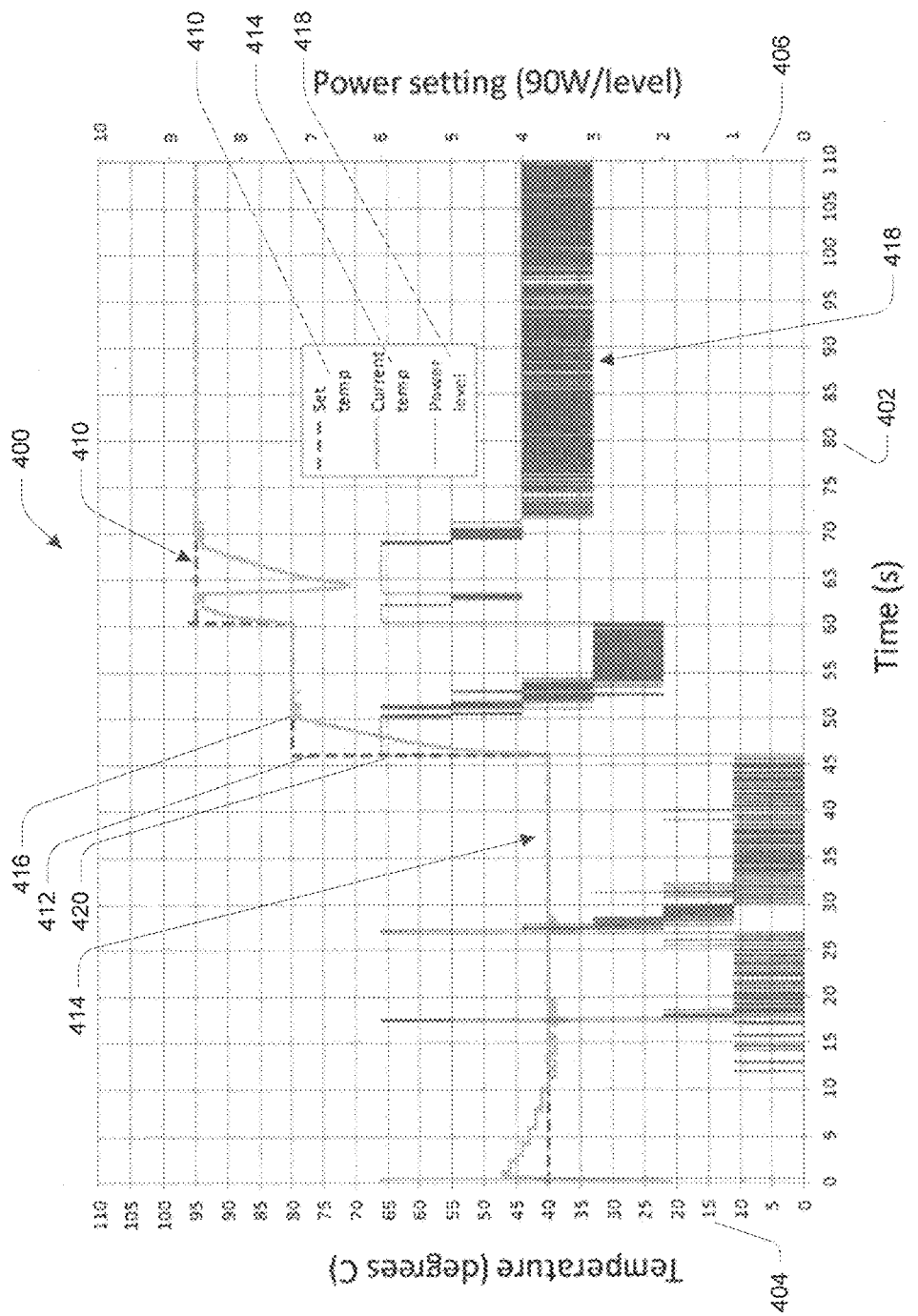
FIG. 4 is a graphic representation of a staged heating process.

The heating process may be understood with reference to FIG. 4 which shows a heating graph 400 with time in seconds on the X-axis 402, temperature in degrees Celsius on the left Y-axis 404 and the power applied to the heating system in power levels on the right Y-axis 406. The set temperature 410 is shown in dotted lines, the measured temperature 414 is shown in a lighter grey, and the applied power level 418 is shown in a solid dark line.

The right Y-axis 406 shows power levels from 1 to 10. In this graph each power level represents approximately 90 Watt, and although only 10 levels are shown, the maximum power that can be supplied by the cooker represented in this graph is 20 levels (or 1800 Watt as used in the US). For simplicity, 20 substantially linear levels have been selected. However it will be understood that a different number of levels associated with different power settings may be selected, for example in a 2400 Watt cooker (as used in Australia), 15 levels each representing 160 Watt may be used. Alternatively, for a nonlinear allocation of power levers, the 15 levels may be associated with increasing power intervals, for example level 1 may be 80 Watt while level 15 may be 250 Watt.

In the heating graph 400 where the set temperature 410 increases, for example at point 412 (at approximately 47 seconds), the measured temperature 414 increases with negligible overshoot at point 416 (at approximately 50 seconds). The applied power 418 increases to level 6 (approximately 540 Watt) at point 420 after which the power decreases to avoid temperature overshoot. The applied power 418 decreases to level 3 where it remains in order to maintain the set temperature until approximately 60 seconds, when the set temperature is changed.

The Control System

The set temperature as well as how that temperature is reached, is controlled with the use of a temperature controller. In some embodiments the controller is an open loop controller, in which case the heating system is switched on according to a predetermined heating profile to achieve the set temperature (with or without a user-selected rate of temperature change).

Figure 5:
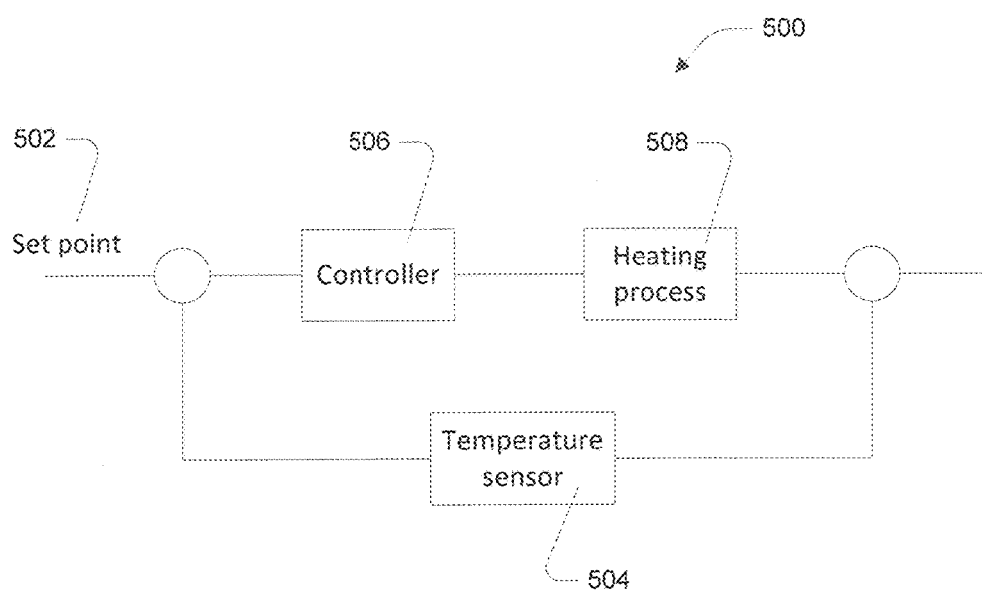
FIG. 5 is a schematic diagram of the feedback control system used to control functions of the induction cooker.

In other embodiments the controller is a closed loop controller whereby the heating system is switched on according to the temperature measured by the one or more temperature sensors. FIG. 5 is a schematic diagram of the feedback control system 500 used to control the induction cooker 100. The temperature set point 502 (generally provided by the user, e.g. via the user interface 202), together with the actual temperature (measured by one or more temperature sensors 504) are provided to the temperature controller 506. The temperature controller 506 forms a part of the cooker controller 204 shown in FIG. 2.

The temperature controller 506 controls the heating process 508, and the resulting temperatures are then measured and fed back to the controller via the temperature sensor(s) 504.

The closed loop temperature control described herein is provided by a proportional-integral-derivative controller (PID controller). Other examples of closed loop controllers that can be used include logic controllers with lookup tables (e.g. a Programmable Logic Controller, PLC), and fuzzy logic controllers (i.e. a microcontroller, DSP or FPGA with fuzzy logic control).

In addition to controlling the temperature achieved by the heating system (for example an induction coil), the PID controller controls the speed that the temperature is reached ("heating speed"), and is also able to control the amount of overshoot of the temperature provided by the heating system. For example, for minimal or no overshoot the set temperature may be reached slowly. On the other hand, if temperature overshoot does not specifically need to be avoided, the set temperature may be reached relatively quickly.

Figure 6:
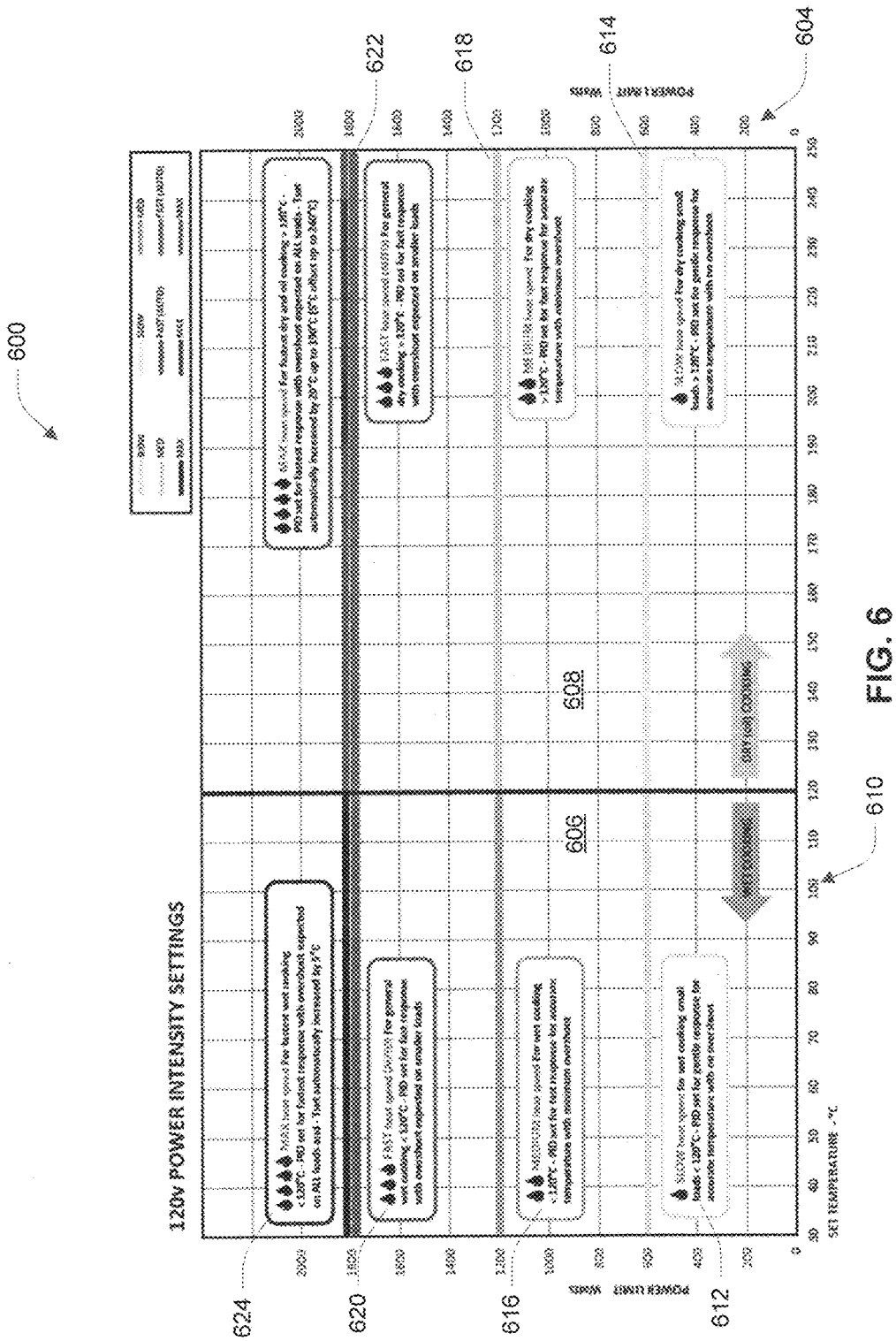
FIG. 6 is a schematic representation of heating and power settings for the induction cooker.

Accordingly the controller operates using one or more heating control modes (for example in the form of the specific PID control parameters), based on the set temperature (and/or a temperature range) and optionally also a rate of temperature change (associated with a maximum power or power range). These control modes describe how the set temperature is to be achieved by the heating system, for example by heating slowly and avoiding a temperature overshoot. The control modes may be default modes, based on default or user-selected parameters (for example as described below with reference to FIG. 6), or the control mode(s) may be user-selected.

To incorporate the relevant rate of temperature change into the control process for achieving a certain set temperature, both the measured temperature difference (between the start temperature and the set temperature) as well as the resulting time associated with the selected rate of temperature change (e.g. 20 seconds to heat from 40 degrees to 60 degrees at a heating rate of 1 degree per second) are split into the same number of intervals. The number and size of intervals are determined according to the rate of temperature change selected and the measured temperature difference. In this way, one or more intermediate set temperatures are determined resulting in a stepwise temperature profile.

The Temperature Probe

As described above, the control system uses temperature measurements in the feedback loop. In some embodiments the temperature measurements are provided by the surface temperature sensor 206 (as shown in FIG. 2) that measures the temperature of the base of the cooking vessel being used. Alternatively or additionally a temperature probe 120 may be used.

Because a user can remove the temperature probe 120 from the pot (and may do so often during the course of cooking), one embodiment of the control system includes testing whether the temperature probe 120 is feeding back an acceptable temperature indicative of a likely temperature to be measured by the probe. If the temperature provided to the control system by the temperature probe 120 is not within a likely temperature range, then the temperature measurement provided by the probe 120 is disregarded, and the temperature measurement used in the control system will be the one provided by the surface temperature sensor 206 (or some other sensor if multiple temperature sensors are used).

The probe temperature range that is tested for may be a variation between 5 and 50%, for example between 10 to 30% less than the set temperature and 10 to 30% more than the set temperature. For example the probe temperature range may be between 10% less than the set temperature and 20% more than the set temperature (i.e. between Tset−10% and Tset+20%).

In some embodiments, for example where a probe is not used or the probe measurement is disregarded, the relevant control algorithm may rely on a temperature offset value, $\Delta T$, to estimate the temperature of the food being cooked in the cooking vessel, such as a pot, from the pot base temperature measurement taken with the surface temperature sensor 206. For example, if $\Delta T=10$ degrees, then when the temperature measurement obtained from the surface temperature sensor 206 is 100 degrees, the control algorithm used to control operation of the cooker will in fact use a food temperature measure of 100−10=90 degrees.

Temperature Setting and a User Selected Rate of Temperature Change

Additionally or alternatively to the default rate of temperature change, the cooker provides an option for the user to set the rate of temperature change associated with the set temperature. It will be appreciated that there are a number of ways in which temperature and rate of temperature change combinations can be selected and implemented. One example may be understood with reference to FIG. 6, which is a schematic representation of cooking power settings 600, with an increase in temperature in degrees Celsius on the X-axis 602 and the power (in Watt) provided to the heating system on the Y-axis 604. Two styles of cooking are described: wet cooking 606 is shown on the left, which typically requires lower temperatures; dry cooking 608 is shown on the right, which typically requires higher temperatures.

When a user selects the required temperature, e.g. 100 degrees 610 for wet cooking, the user can then also select the rate of temperature change according to user preference:
- slow heating 612 where the power supplied to the heating system is capped at a low power level 614 (600 Watt in this example);
- medium heating 616 where the power supplied to the heating system is capped at a medium power level 616 (1200 Watt in this example);
- fast heating 620 where the power supplied to the heating system is capped at a high power level 622 (just below 1800 Watt in this example);
- maximum heating 624 where the power supplied to the heating system is the maximum power for the appliance (1800 Watt in this example).

1.2 Cooking Profiles and Cooking Sequences

As described above the cooker may operate using one-step heating or temperature profiles where a set temperature is selected and a default or user selected rate of temperature change is selected. In other embodiments, multi-step temperature profiles may be used. These include:
- simple cooking profiles (which include one or two set temperatures with a default or set rate of temperature change, and optional time duration settings); and
- complex cooking sequences (which include one or more stages with associated set temperatures, rates of temperature change and time duration settings).

In some embodiments cooking profiles are pre-programmed on the cooker so that the user makes a single selection to activate a sequence of temperature profiles. The user may alter these in real-time during the cooking process. In other embodiments the user selects a pre-programmed cooking sequence, or the user predefines a cooking sequence and then activates the sequence when cooking is commenced. Again, the user may modify the cooking sequence in real-time during the cooking process. In yet further embodiments the user may set a cooking sequence during the cooking process. Where cooking sequences are modified, these modifications may be saved on the cooker, either by default or according to user selection.

Cooking Profiles

In some embodiments cooking profiles are pre-programmed on the cooker so that the user makes a single selection to activate a sequence of temperature profiles.

One example of a cooking profile is a "simmer" profile. Another example of a cooking profile is a "boil then simmer" profile.

In one embodiment the cooking profiles use temperature measurements and set temperatures for known foods. For example, for water a "simmer" profile may be as simple as a temperature setting between 95 and 97 degrees Celsius. Similarly, a "boil then simmer" profile for water may be achieved by applying the maximum power until the measured temperature reaches 100 degrees Celsius, after which the set temperature is changed to between 95 and 97 degrees.

However, because different types of food behave differently, and because different temperatures are required at different atmospheric pressure (e.g. at different altitudes), another embodiment provides cooking profiles that utilise the rate of temperature change as determined from the temperature measurements. A transition from one cooking stage to the next stage is based on a measured rate of temperature change (of the pot or the food).

For example, for a "simmer" profile the rate of temperature change can be determined from the temperature measurements (e.g. over time intervals of 5-10 seconds, for example over time intervals of 6 seconds per interval). Once the rate of temperature change falls below a rate threshold (for example below ½ degree per second, 1 degree per second or 2 degrees per second), this is an indication that boiling point is being approached and the simmer set temperature selected accordingly.

Similarly, for a "boil then simmer" profile, if the measured temperature remains steady for a certain period of time, referred to herein as the "boiling threshold time" (e.g. 5 seconds, 10 seconds, 30 seconds or 60 seconds etc.), then it can be determined that the boiling point has been reached. The set temperature for the subsequent simmer stage can then be set to a temperature below the measured boiling temperature, for example the simmer temperature may be selected to be between 1 and 10% less than the measured boiling temperature.

It will be understood that this type of control is closed loop control that relies on the feedback of at least a temperature measure.

Cooking Sequences

In some embodiments the user selects a pre-programmed cooking sequence, or the user predefines a cooking sequence and then activates the sequence when cooking is commenced. The user may alter the cooking sequence in real-time during the cooking process.

Figure 7:
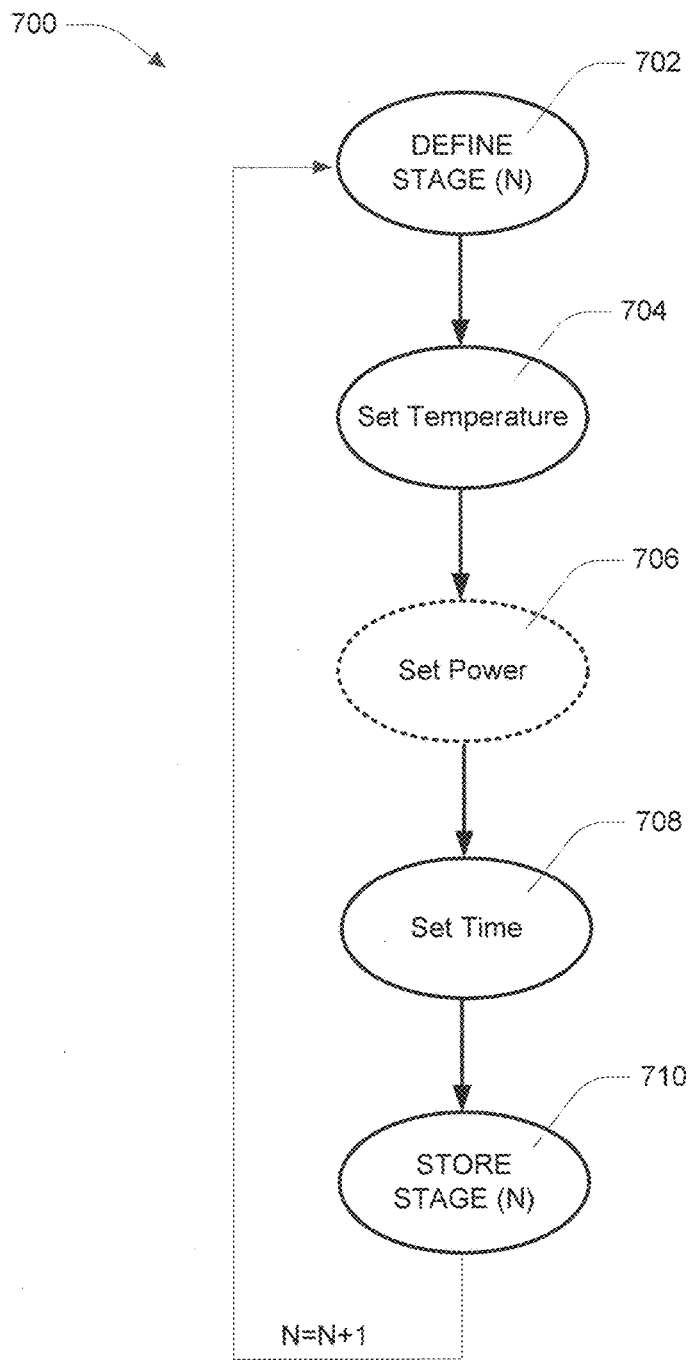
FIG. 7 is a flow diagram of a method for setting a cooking profile.

As an example, FIG. 7 shows a flow diagram 700 of the method by which a user predefines a cooking sequence. At step 702 the relevant stage (e.g. the initial stage, or a subsequent stage) of the cooking sequence is commenced and defined as such. At step 704 the required temperature is set. At optional step 706 the required rate of temperature change is set. If a rate of temperature change is not set then the default rate of temperature change is used (as described in more detail elsewhere herein).

At step 708 the user selects the duration that the set temperature is to be maintained. In some embodiments this duration time setting is interpreted to define a time period that starts as soon as heating starts, in other embodiments the time period starts when the set temperature is reached, in other embodiments the time period starts when a threshold temperature is reached (where the threshold temperature is between the initial and the set temperature).

At step 710 the settings for the relevant stage are stored, and the process is repeated as required.

Figure 8:
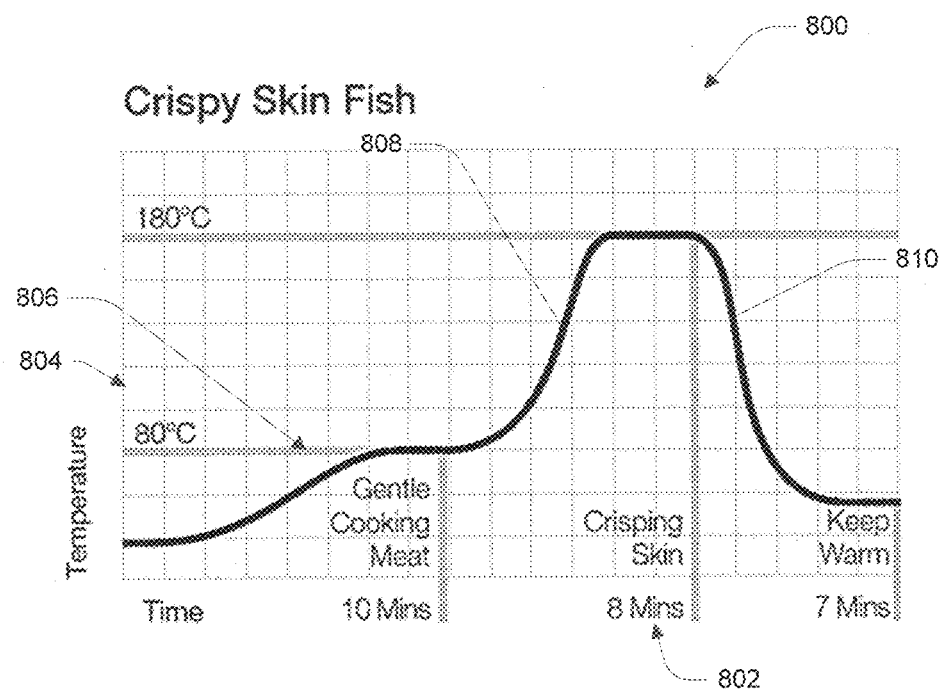
FIG. 8 is an example cooking profile set up using the method shown in FIG. 7.

By following this process a cooking sequence as shown in FIG. 8 can be set up. FIG. 8 shows a graph of a cooking sequence Boo for preparing crispy skin fish, with time in seconds on the X-axis 802 and temperature in degrees Celsius on the Y-axis 804.

When cooking fish, the delicate proteins in the fish meat require a low temperature but the skin requires a high temperature to develop more flavour and create a crispy texture. To achieve this, the fish is initially cooked slowly at a low temperature, and the temperature is then increased very quickly to crisp the skin. This method avoids overcooking of the outer portion of the fish protein and undercooking the inside, while still achieving a crispy finish on the skin.

For this technique, high user intervention is typically required to cook at a low temperature to start with, and then, over time, to increase the temperature to crisp the skin. However, where a cooking sequence is predefined by the user (or even pre-programmed on the cooker), the process can be simplified for the user.

Three heating profiles make up the cooking sequence 800. The first heating profile 806 is shown between 0 and 10 minutes, and is a long, slow heating process to gently cook the meat. The second heating profile 808 is shown between 10 and 18 minutes, and includes a fast increase in temperature to a high temperature (180 degrees, as shown here), and this high temperature is used to crisp the skin quickly. The third heating profile 810 is shown between 18 and 25 minutes, and is an optional "keep warm" step in this process, that keeps the cooked fish warm for 7 minutes before serving.

To accommodate variability (such as type of fish, weight and/or thickness, and/or initial food temperature) the user can modify the temperature, rate of temperature change and/or stage duration during the cooking process.

2. Safety Features of the Induction Cooker

The control system of the cooker is also used to control a number of safety features, including:

(1) internal temperature control (e.g. by cooling appliance subsystems such as the heating system, the glass surface, sensors such as thermostats, and/or of electronics such as power electronics); and (2) the detection of cooking vessels on the cooking surface.

2.1 Internal Temperature Control: Fan Control

In an induction cooker, the coil is used to heat the cooking vessel placed on the cooking surface via induction. Because the cooking vessel heats up, that in turn has the unwanted result of the coil, the glass heating surface and/or the cooking surface temperature sensor assembly heating up as well. In order to keep the coil, glass and/or sensor assembly cool, a fan is used to pass air through the cooker along a cooling path adjacent to the coil and cooking surface.

Figure 9:
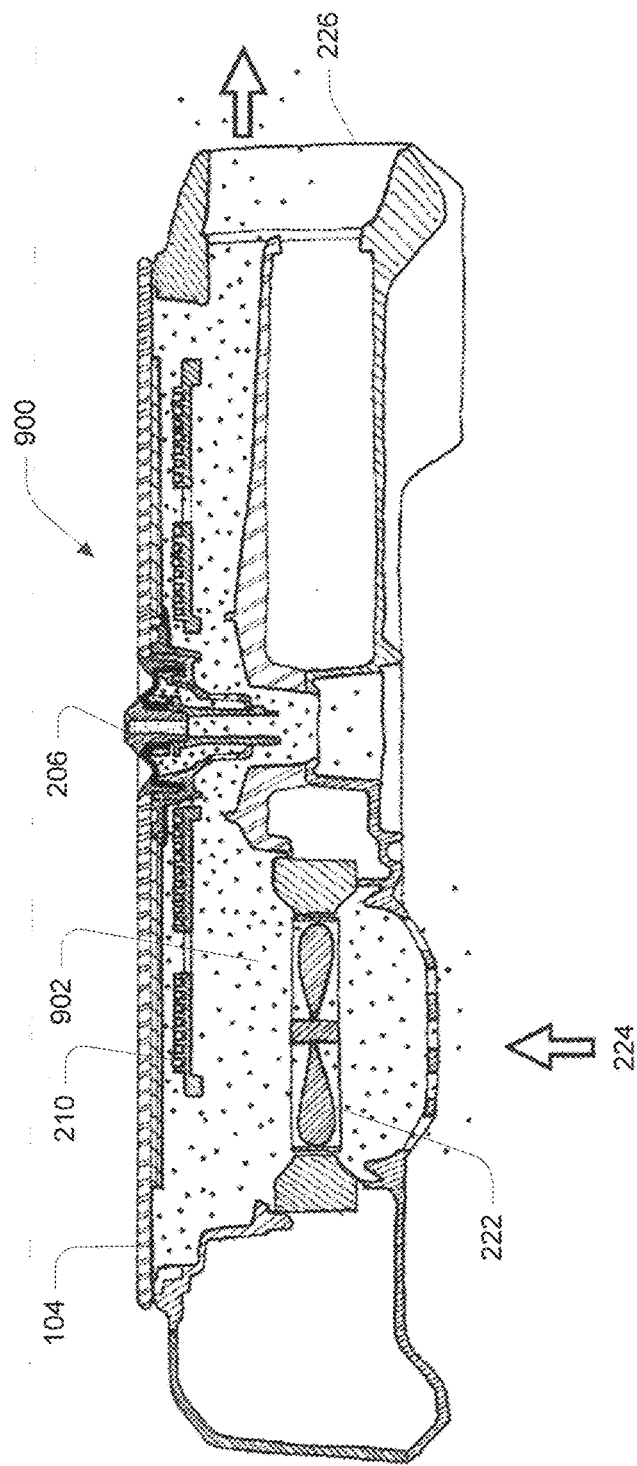
FIG. 9 is a cross section of the induction cooker of FIG. 1.

As was described above with reference to FIG. 2, the induction cooker 100 includes a fan assembly 220 with a coil fan 222 as well as an electronics fan 228. The control and operation of the fan assembly may be further understood with reference to FIG. 9 which shows a cross section 900 of the induction cooker. In this cross section, the coil fan 222 is visible, and the coil cooling path 902 is shown extending adjacent to the coil 210 from the coil ingress air path 224 to the coil egress air path 226. The various fans (in this example the coil fan 222 and electronics fan 228) operate independently and are controlled independently.

The coil fan 222 is a blower fan or axial fan that can be either an on/off fan, or the fan can have two or more speed settings (e.g. low, medium and high). For the embodiment described here, because the switching speed used for the fan is relatively high (e.g. the fan may be switched on or off once every 5 seconds, every second, or more often), the full power setting is used as opposed to other speed settings. Because the switching speed is relatively fast, the set speed is typically not reached before the fan is switched off again. Consequently, fan speed settings for this embodiment correspond to the duty cycle of the fan. The example fan implementation referred to in this discussion has up to 20 speed settings corresponding to a linear increase in duty cycle from 0% to 100%.

As with the operation of the cooker, a control system (implemented on the controller 204) is used to control the operation of the fans, e.g. a closed loop controller.

For the coil fan, the operational values fed back into the control system include one or more temperatures associated with appliance subsystem(s), e.g. measured at or close to the coil, the glass and/or the temperature sensor assembly in the cooking surface (which includes the surface temperature sensor 206). In its simplest form, the temperature of the coil 210 is used. The temperature of the coil, glass and/or sensor assembly may be estimated from the temperature measured with the surface temperature sensor 206, and/or determined from one or more temperature sensors adjacent the coil, glass and/or sensor assembly (not shown).

In addition, the running average power level delivered to the coil is fed back to the control system. This average power level is a predictive power measure: an indication of the heating to be expected in the coil.

The average power level is calculated from the power supplied to the coil which is either measured between the power source 208 and the coil 210, or alternatively provided to the fan control system by the controller 204 controlling the power source 208. The power level is averaged over a period of time, for example over 1, 5, 10 or 60 seconds. Average power levels are mapped to fan speed settings, for example an average power level of 10 may be mapped to a fan speed setting provided by a 60% duty cycle. Referring to the example used with reference to FIG. 4, a power level of 10 accords with 50% power or 900 W in a 1.8 kW system.

Figure 10:
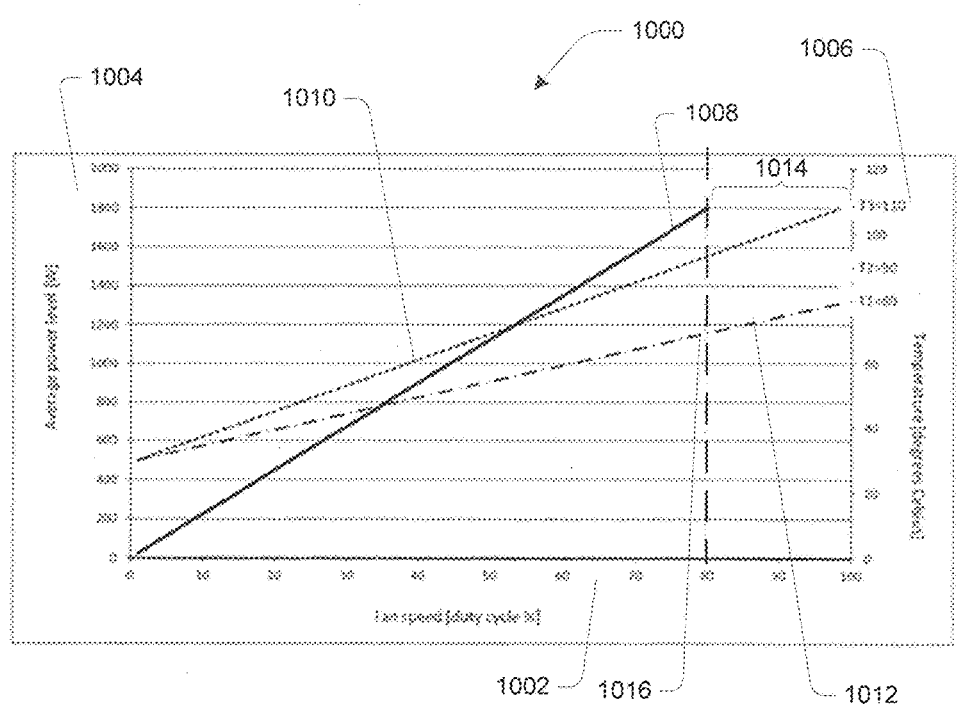
FIG. 10 is a graph showing fan speed mapped to average power level and temperature.

FIG. 10 is a graph 1000 showing fan speed (measured in duty cycle %) on the X-axis 1002 mapped to:
  (a) average power level (measured in Watt) on the left Y-axis 1004, and
  (b) temperature (in degrees Celsius) on the right Y-axis 1006.

For the average power level mapping 1008 (shown in solid line), the maximum power level (1800 Watt in this example) is mapped to an 80% duty cycle, indicating a 20% fan operating buffer 1014 with respect to the power provided to the coil. The coil temperature mapping 1010 (shown in dotted line), on the other hand, is mapped to the full range of fan operation, the 20% fan operating buffer 1014 therefore being used only if the coil temperature is very high (e.g. above 90 degrees Celsius). It is anticipated that the 20% fan operating buffer 1014 would typically be relied on under unusual circumstances, for example when the ambient temperature is high, or when there is restricted fan airflow.

One advantage of keeping the usual operation of the fan to a duty cycle of 80% or below, is a reduction in noise caused by the operation of the fan.

The fan control system receives as inputs both the average power level and the coil temperature, and maps these values to fan speeds according to the mapping shown in FIG. 10. In this embodiment, fan speed is selected according to the mapping resulting in the highest fan speed. For example, if the average power level is Boo Watt (mapped to 35% fan duty cycle) and the coil temperature is 70 degrees (mapped to a 50% duty cycle), then the fan will be set to the highest mapping, i.e. 50%.

In other embodiments, other combinations may be used to select the fan speed. For example, a mapping may be used wherein the average power mapping and the temperature mapping are added to one another to obtain the required fan speed.

In addition to the coil fan 222, the fan assembly 220 also includes a fan for cooling electronic circuitry, referred to herein as an electronics fan 228. Control of the electronics fan 228 is comparable to the control of the coil fan 222 as described above in that the control system controlling the electronics fan provides control to the fan based on two input values:
  a heat sink temperature measure (where the heat sink is associated with the internal electronics of the induction cooker), and
  the running average power level as described above.

Again, the running average power is an indication of the heating that can be expected in the electronics, in particular heat in the power switch used to switch the induction coil (this can be, e.g. an insulated-gate bipolar transistor (IGBT) power switch). For the electronics fan, the same average power level mapping 1008 is used as for the coil fan.

However, as the electronics is very sensitive to overheating, the heat sink temperature mapping 1012 (shown in dot-dash line) associated with the electronics will pass the threshold 1016 to use the 20% fan buffer at around 70 degrees. At a first threshold of the heat sink temperature T1, the fan will operate at full speed. The cooktop will continue to operate in this manner, with the power to the coil as required based on the user set temperature and with the fan at maximum speed, within a maximum power temperature range $\Delta T=T2-T1$. However, if the heat sink temperature exceeds a second threshold temperature, T2, then the controller will reduce the power to the coil in order to further reduce the temperature measured at the heat sink. The coil power reduction may be determined in many different ways, for example (1) switched off completely for a period of time e.g. 30-120 seconds, (2) reduced to half power until the measured heat sink temperature falls below the first threshold temperature T1 (or another defined temperature), or (3) to a fraction of maximum power depending on the measured heat sink temperature, for example as shown in Table 2 below:

TABLE 2

Example of heat sink temperature to coil power mapping

| Heat sink temperature [Degrees Celsius] | Power Level [Maximum power split into 20 levels] |
|---|---|
| <65 | 20 |
| 65-70 | 20 |
| 70-72 | 20 |
| 72-74 | 19 |
| 74-76 | 18 |
| 76-78 | 17 |
| 78-80 | 16 |
| 80-82 | 15 |
| 82-84 | 14 |
| 84-86 | 13 |
| 86-90 | 12 |
| >90 | STOP |

In the example depicted in Table 2, the first threshold temperature T1=65 degrees Celsius. The second threshold temperature T2=72 degrees Celsius (the maximum power temperature range $\Delta T=12$ degrees). As shown in Table 2, a third temperature threshold, T3, is also used as an absolute maximum in order to protect the electronics. In this example T3=90 degrees and will result in power to the coil being switched off. It will be understood that the temperatures shown are only examples, and depending on the particular construction of the cooktop and electronics used, could vary e.g. by up to ±10-20%. For example, in the example shown in FIG. 10, T1=80, T2=90 and T3=110.

2.2 Internal Temperature Control: Heating System

In conventional cooktops, overheating of the heating system, and in particular of the cooking vessel and its contents, are avoided by including a fuse in the heating circuitry. If a fuse is used, the cooktop becomes unusable after the fuse is activated. Also, because the temperature at which the fuse is activated is not precise, normal operating temperatures are typically set lower than the fuse specification to avoid unnecessary activation of the fuse. Unfortunately this is also lower than some desired cooking temperatures.

To avoid problems associated with the use of a fuse, an alternative approach is proposed. A low voltage safety circuit (also called a Safety Extra Low Voltage, or SELV, circuit) is used to detect the temperature of the cooktop surface and/or the cooking vessel, and the safety circuit temporarily and reversibly disables operation of the heating system if the detected temperature is above a safety threshold. When an acceptably low temperature is subsequently detected, the low voltage safety circuit again enables operation of the heating system. The proposed system does not rely on a software component, and is a hardware-based solution.

A low voltage (or SELV) implementation is used for the safety circuit so that the user is not exposed to the high voltage circuit associated with the heating system. For this, isolation between the safety circuit and the heating circuit is also required.

In its simplest form, the safety circuit includes a temperature sensor providing a temperature indicative of the temperature of the cooktop surface and/or cooking vessel, a temperature to voltage converter, and a comparator to compare the measured temperature and a threshold safety temperature. The output of the comparator then operates an actuator (e.g. a switch) typically associated with an isolation means that isolates the low voltage safety circuit from the high voltage heating circuitry. The switch is used to enable (or activate) the heating system for safe operation, and to disable the heating system when the measured temperature exceeds the threshold safety temperature.

The temperature sensor(s) can be, for example, one of many types of thermocouple, a thermistor (NTC or PTC type), or a semiconductor thermal sensor. The isolation means (or isolator) can be implemented in one of various suitable ways, for example as a mechanical isolator, or as an optical isolator.

To ensure the safe operation of the cooktop, two or more safety circuits are provided in series so that each one of the two or more safety circuits must operate correctly (and detect temperatures below the threshold safety temperature) in order for the heating system to be enabled. Two sensors are used to detect the relevant temperature, each sensor associated with a safety circuit. Both sensors must sense a temperature below the safety threshold in order for both safety circuits to operate in order to enable the heating system. Even if only one of the sensors detects overheating, then that associated heating circuit will disable the heating system.

Figure 11:
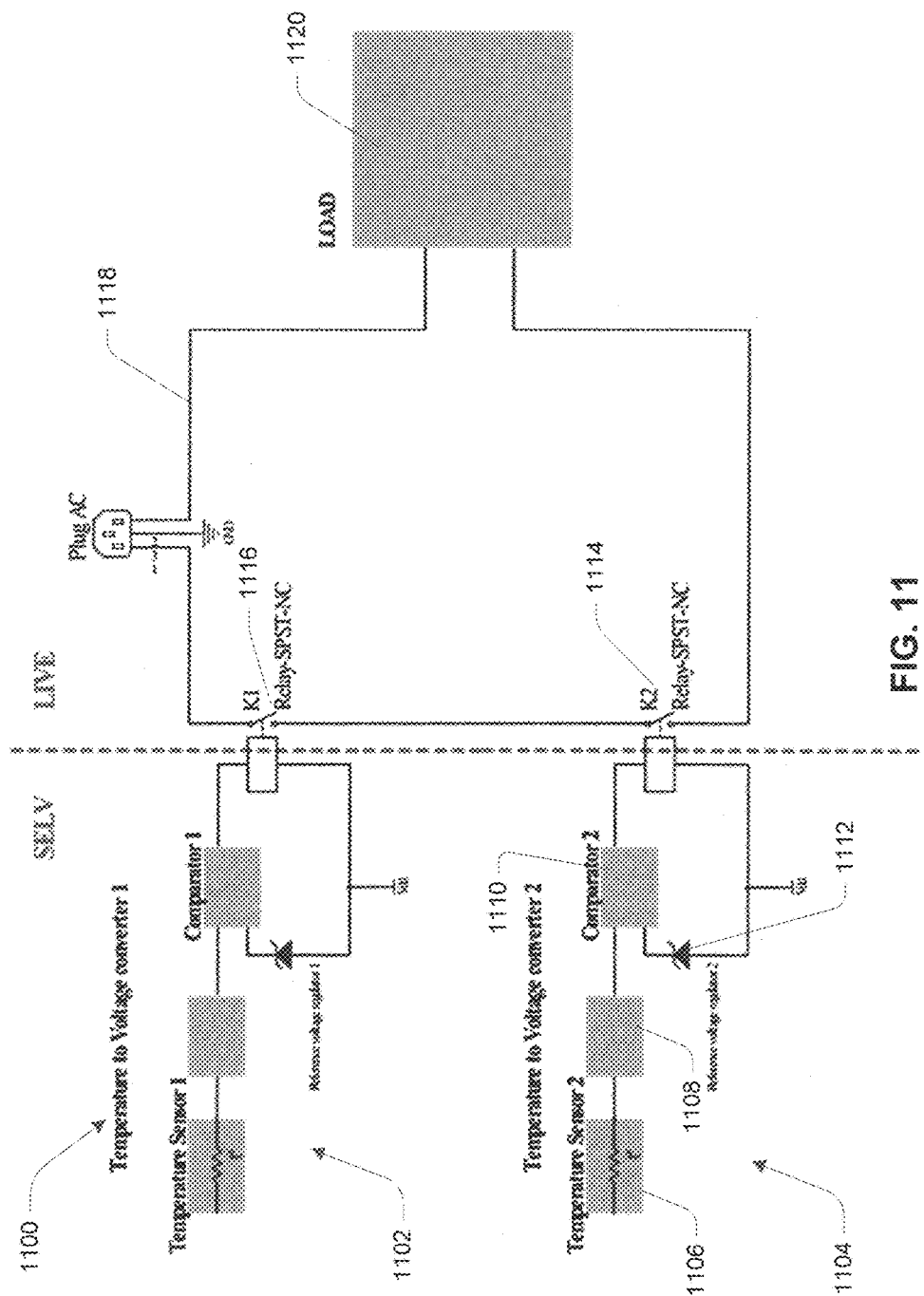
FIG. 11 is a schematic diagram of one embodiment of an overheating protection system.

FIG. 11 shows one embodiment of a safety circuit 1100. The safety circuit 1100 includes two individual safety circuits 1102, 1104 that operate in series. Each individual safety circuit includes a temperature sensor 1106, a temperature to voltage converter 1108, and a comparator 1110 that compares the voltage associated with the measured temperature with a reference voltage 1112 associated with the threshold safety temperature. The output of the comparator controls the operation of a switch, in this case an electro-mechanical device such as a relay 1114. When both individual safety circuits 1102, 1104 detect cooktop surface and/or cooking vessel temperatures below the threshold safety temperature, then both switches are closed (relay 1114 in circuit 1104 and relay 1116 in circuit 1102), thereby completing the high voltage heating circuit 1118 and activating the heating system 1120.

Figure 12:
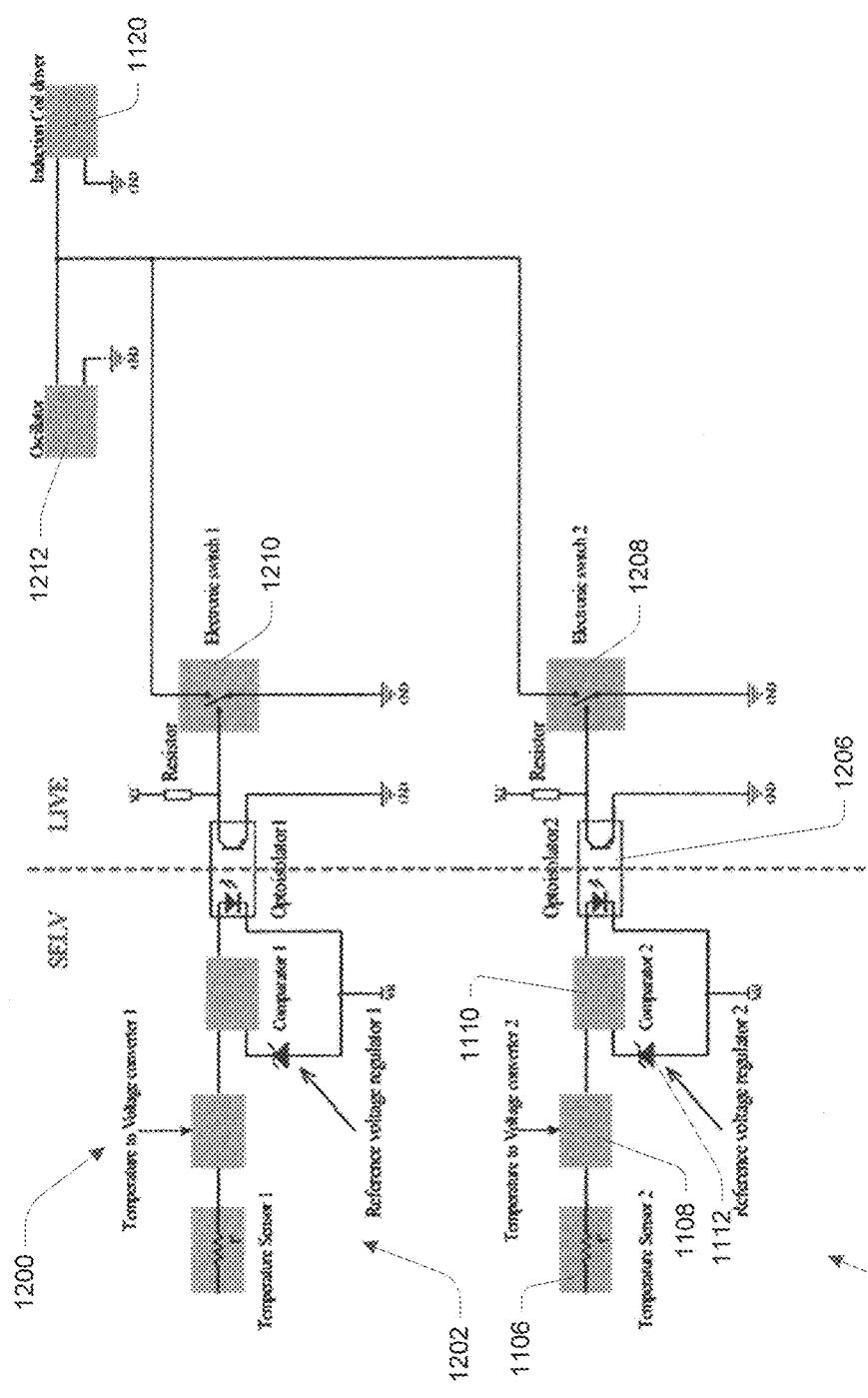
FIG. 12 is a schematic diagram of another embodiment of an overheating protection system.

FIG. 12 shows another embodiment of a safety circuit 1200 including two individual circuits 1202, 1204 for use in an induction cooker. Each individual circuit includes a temperature sensor 1106, a temperature to voltage converter 1108, and a comparator 1110 that compares the voltage associated with the measured temperature with a reference voltage 1112 associated with the threshold safety temperature.

The output of the comparator is provided to an optical assembly, in this case an opto-coupler followed by an electronic switch. The low voltage safety circuit is isolated from the high voltage circuit by an opto-coupler 1206, and the comparator output then controls the electronic switch 1208. When either of the electronic switches 1208, 1210 for each of the individual safety circuits 1202, 1204 is closed, the oscillator 1212 required for the operation of the heating system 1120 (in this case an induction coil) is short circuited and the induction coil is disabled. Therefore, for the induction coil to operate, both safety circuits 1202, 1204 must detect a temperature below the threshold safety temperature in order for the electronic switches 1208, 1210 to remain open. Malfunction of any of the components in the safety circuit will result in power not being supplied to the induction coil, making it an extra safe implementation.

An advantageous feature of this configuration is that it is possible to use the same temperature sensors for the safety circuit that are used for measuring the temperature of the cooking vessel, which temperature measures are fed back to the control circuit controlling the operation of the induction coil. In other words, temperature sensors 1106 shown in FIG. 11 and FIG. 12, may be the same as temperature sensors 1310 shown in FIG. 13A and described in more detail elsewhere herein.

2.3 Pot Detection

Induction cookers have pot detection for safety purposes to prevent non-intentional heating of, for example, small metallic objects and utensils left on the top surface of the induction cooker.

Electrical Detection: On/Off Cycling

In one embodiment electrical detection involves the induction heating component to be switched on for short periods of time, current resulting from on cycles when a pot is present is detected and then the current is switched off again. The detected current is compared to a threshold current to determine the presence of a pot.

The power used is as low as possible to not unnecessarily contribute to heating the pot, but to still result in sufficient induction required to produce a current that can be measured for the pot detection. To this end, the power used for electrical detection is selected to be between 100 and 300 Watt, for example 200 Watt.

Typical on/off cycles are 1 second on, 1 second off, to provide fast and reliable detection. However, with this 50% duty cycle, unintentional heating of the coil is likely as the average power applied to the pot is too high to maintain a low temperature. If the on period is too short (i.e. shorter than 1 second) the pot detection can be unreliable due to circuit stabilisation. If the detection is not undertaken repeatedly, it can take some time to detect removal of a pot.

One way of overcoming these problems is to alter the on/off cycle timing, so that each on cycle (or most of the on cycles, e.g. more than 50% of the on cycles) has a duration of one time interval, while some or all of the off cycles have similar or varying durations of multiples of one time interval.

The value of the multiple of one time interval associated with each off cycle may be based on an associated heating duration and an associated target temperature. An example of this type of varying duty cycle on/off cycling is shown in Table 3 below.

TABLE 3

On/Off cycle time used for pot detection

| Target Temperature (Degrees Celsius) | TIME (min) | | | | |
|---|---|---|---|---|---|
| | 2 min | 5 min | 10 min | 20 min | 30 min |
| 30-40 | 1 s/1 s off | 1 s/3 s off | 1 s/5 s off | 1 s/10 s off | 1 s/10 s off |
| 40-45 | 1 s/1 s off | 1 s/1 s off | 1 s/3 s off | 1 s/5 s off | 1 s/10 s off |
| 45-50 | 1 s/1 s off | 1 s/1 s off | 1 s/1 s off | 1 s/3 s off | 1 s/5 s off |
| 50 and over | 1 s/1 s off | 1 s/1 s off | 1 s/1 s off | 1 s/1 s off | 1 s/1 s off |

To enable low temperatures to be maintained for long periods, the pot detection circuit may be enabled for a predetermined period (e.g. 1 second) to provide accurate detection, but cycled off for a variable time based on target temperature, power settings and/or the duration of a heating period. Providing longer off times (e.g. between 2 and 15 seconds, or between 3 and 10 seconds as shown) when low temperatures are maintain over a longer period of time (e.g. for more than 2 minutes, or for more than 5 minutes etc.) helps to reduce the inadvertent heating effect of the pot detection system.

Another method of dynamically changing the pot detection is to only initiate a pot detection cycle when the temperature controller determines that the heating component is to be enabled (typically due to temperature control). In this instance the temperature controller is integrated with the pot detection circuit.

Capacitive Pot Detection

Capacitive detection may be used with or without the electrical detection disclosed above. It will be appreciated that capacitive detection does not require activation of the heating system, and therefore can be used when maintaining low cooking temperatures. In one embodiment, capacitive detection can be used below a predetermined set threshold temperature, and then electrical detection and/or capacitive detection can be used above the threshold temperature.

Pot Detection by Detecting Movement of the Temperature Assembly

When a cooking vessel such as a pot is placed on the cooktop, the biased temperature assembly is pushed downward. The presence of a cooking vessel can therefore be detected by sensing movement of the temperature assembly. In an example embodiment, a reed switch is operatively associated with a biased temperature sensor mounted in the cooking surface, such that when the temperature sensor is depressed by a cooking item the switch is activated to enable cooking. This can be used in addition to other detection methods.

Figure 13A:
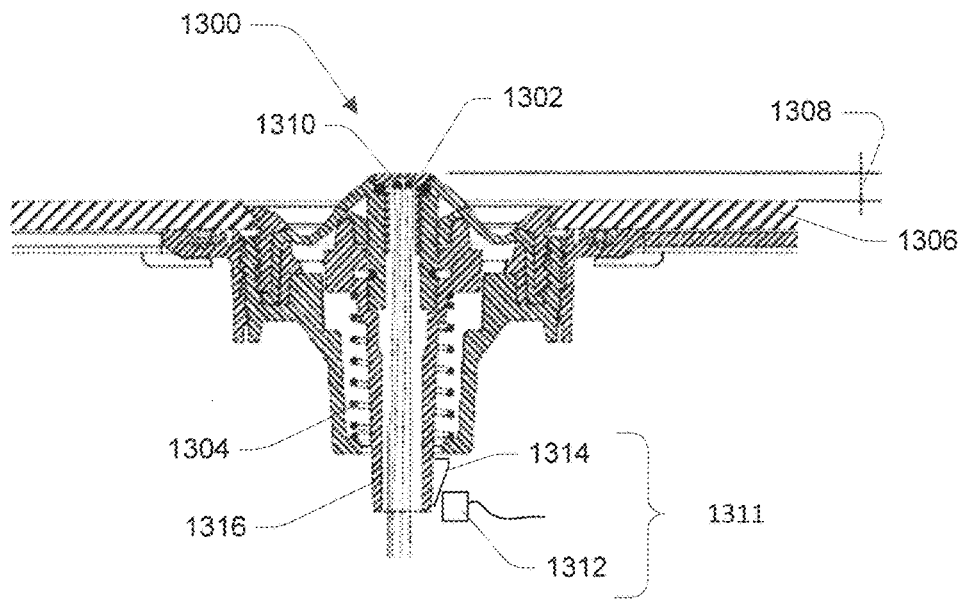
FIG. 13A and FIG. 13B show partial cross section views of an embodiment of a pot detection system.
Figure 13B:
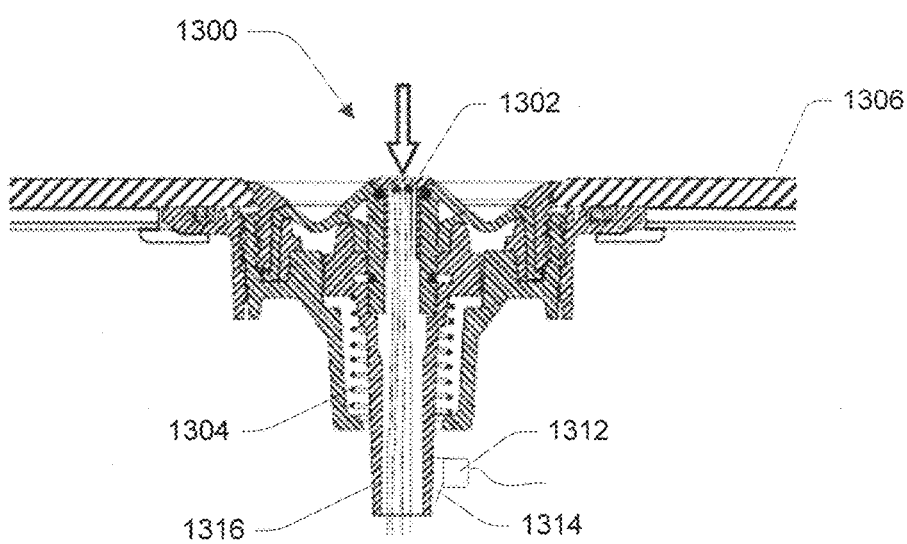

FIG. 13A shows a biased temperature sensor assembly 1300, shown in the raised configuration. FIG. 13B shows the biased temperature sensor assembly 1300, shown in the lowered configuration.

Referring to FIG. 13A, in a rest position, the upper surface of the sensor cap 1302 is elevated above the upper surface of the cooking surface by the action of the spring 1304. In the raised position, the sensor cap is raised above the cooking surface 1306 by a distance 1308 as indicated. The amount of downward movement of the temperature sensing assembly 1300 is typically equivalent to the distance 1308 for a flat-bottomed vessel, and this distance may be between 1 and 10 mm, for example between 2 and 5 mm, such as 3.5 mm.

One or more temperature sensors 1310 are located directly beneath the flat upper surface of the cap 1302. Because of the operation of the spring 1304, the sensors 1310 (e.g. NTC sensors) are able to make intimate contact with the underside of a cooking vessel because the cap 1302 is thermally conductive, and because the spring 1304 is able to be compressed as shown in FIG. 13B. In the example shown here, two temperature sensors 1310 are used. As described elsewhere herein, these two temperature sensors may be used in a safety circuit for preventing overheating of the cooktop.

Referring to FIG. 13B, it can be seen that when a cooking vessel is placed onto the cooking surface it urges the cap 1302 downward until the cap 1302 is flush with the upper surface of the cooking surface 1306.

The moving parts (associated with the temperature sensor assembly) and the stationary parts are operatively associated with a position sensor assembly 1311, as shown in FIG. 13A including a switch element 1312 and an actuator 1314. In this example embodiment the actuator 1314 is located on the moving parts of the temperature sensor, in particular on a lower holder 1316 of the temperature sensor assembly 1300, and a switch component 1312 is fixed with respect to the stationary parts. Movement of the temperature sensor assembly 1300 from a raised configuration (FIG. 13A) to lowered configuration (FIG. 13B) activates or reactivates the switch 1312 to send a signal to the controller 204 that a cooking vessel is detected.

In other embodiments, the temperature sensor assembly is operatively connected to or includes an integral physical switch to disable operation of the heating system if a cooking vessel is not placed on the cooking surface. The sensor then controls the switch (such as a relay) that enables and disables power delivered to a heating component.

When positioning sensing is used together with electrical sensing for pot detection, the logic may be understood with reference to Table 4 below. When both the position sensor and the electrical method determine the presence of a vessel, a vessel is present. If the electrical method detects the presence of a conductor but the position sensor does not detect a movement in the temperature sensing assembly 1300, then a vessel is not present. If the position sensor detects the temperature sensing assembly has been depressed, but the electrical method does not detect the presence of a conductor, an error message is provided to the user via the user interface (e.g. perhaps a vessel has been placed on the cooktop that is not appropriate for induction).

TABLE 4

Logic for a combination of electrical pot detection and a single position sensor

| S1 | Electrical method | Determination |
|---|---|---|
| Y | Y | Y |
| N | Y | N |
| N | N | N |
| Y | N | Error |

With time as the cooktop ages, the resting position of the temperature sensing assembly 1300 may change so that the distance 1308 reduces (for example, from 4 mm to 2 mm). To accommodate for such changes and to ensure the accurate detection of the presence of a cooking vessel, a double sensor configuration may be used with two position sensors that are offset with respect to one another. Where the two sensors are offset by less than the distance 1308, it would be expected under normal working conditions that:

(1) neither sensors would detect the presence of a cooking vessel when the temperature sensing assembly is not depressed, and (2) both sensors would detect the presence of a cooking vessel when the temperature sensing assembly is depressed.

For such a configuration, the distance that the two sensors are offset may be, for example, between 0.5 mm and 3 mm, such as 1 mm.

Figure 13C:
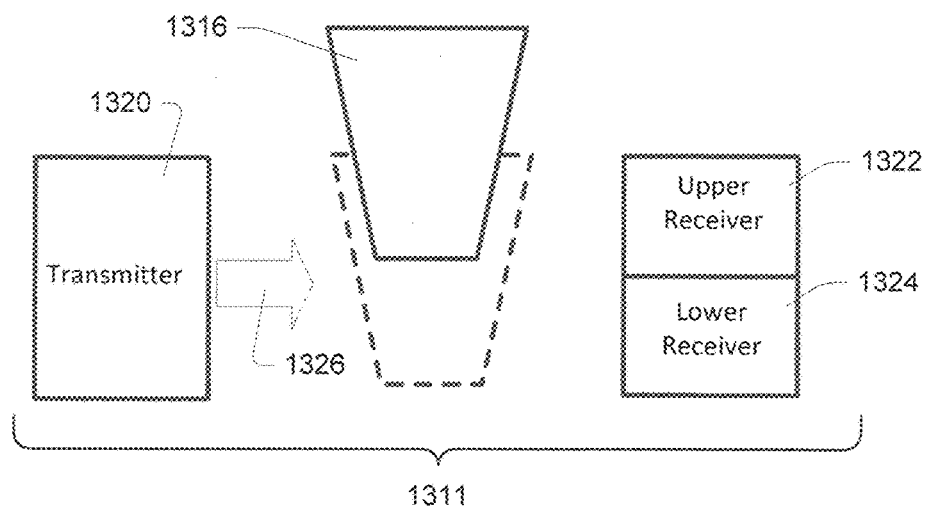
FIG. 13C shows a schematic representation of another embodiment of a pot detection system.
Figure 13D:
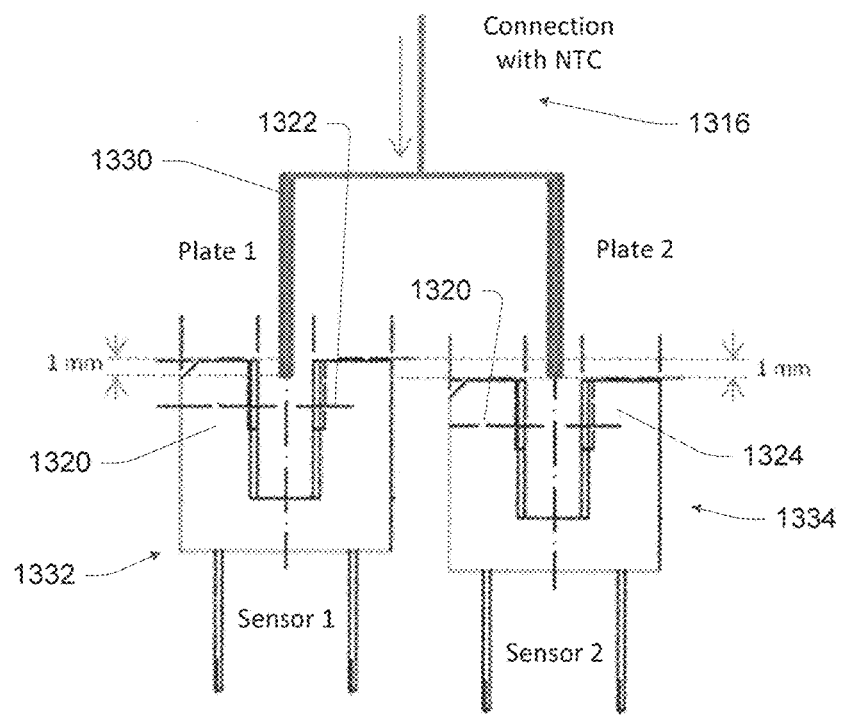
FIG. 13D shows a schematic representation of another embodiment of a pot detection system.

The embodiment shown in FIG. 13C has a position sensor assembly 1311 that includes a double opto-coupler arrangement. In particular, one or more optical transmitters 1320 (or a transmitter array), e.g. an infrared emitting diode, is positioned on one side of the movement path of the lower holder 1316. Two or more optical receivers (or a receiver array) are positioned on the other side of the movement path of the lower holder 1316, in this example an upper receiver 1322 and a lower receiver 1324. In the embodiment shown in FIG. 13D the lower holder 1316 extends into a double or forked plate 1330, and the opto-coupler arrangement includes two transmitter-receiver pairs: an upper pair 1332 and a lower pair 1334. When a cooking vessel is placed on the cooktop, the temperature sensor assembly 1300 moves downward so that the signal transmitted from the transmitter 1320 will not be received by the upper receiver 1322 or the lower receiver 1324.

The logic of this configuration may be understood with reference to Table 5 below (S1 is the upper sensor, S2 is the lower sensor).

TABLE 5

Logic for combined pot detection method (two optical sensors)

| S1 | S2 | Electrical method | Determination |
|----|----|-------------------|---------------|
| Y | Y | Y | Y |
| Y | Y | N | N |
| N | N | Y | N (use S1) |
| N | N | N | N (use S1, do calibration after a setting period) |
| N | Y | Y | Error |
| N | Y | N | N/Error |
| Y | N | N | N (start to use S2, never calibrate) |
| Y | N | Y | Remove cookware. If:<br>1. NNN, start to use S1, YNY is Y<br>2. YNN, start to use S2, YNY is N<br>3. YYN, the temperature sensor assembly needs to be replaced |

The first four rows are straight forward: either both position sensors detect a changed position in the temperature sensor assembly, or both sensors don't. For the former, the electrical sensing method determines the presence (or not) of cookware. For the latter, the outcome of the electrical method is not used.

Rows five and six show error combinations where the upper position sensor does not detect the temperature sensing assembly while the lower position sensor does.

The bottom two lines show the scenario where the upper receiver 1322 detects movement of the temperature sensor assembly, while the lower receiver 1324 does not. If the electrical method does not detect the presence of cookware, then the determination is that no cookware is present. If this combination is consistently recorded, the controller may determine that aging has resulted in a permanent downward movement of the temperature sensor assembly and consequently the controller will rely on the determination of the lower receiver 1324 alone. If, however, the electrical method does detect cookware (i.e. the YNY combination), the upper receiver 1322 detects that the temperature sensor assembly has moved, but it has not moved all the way down to trigger the lower receiver 1324 despite the electrical method detecting the presence of cookware. This could be for a number of reasons. One reason may be that the cookware has a concave base and not a flat base, so that the sensor assembly is not pushed down all the way. Another reason may be that the temperature assembly has aged and therefore permanently sunk down, while the cookware does not cover the cap 1302 (e.g. the cookware is placed at the edge of the cooking surface 1306).

For this final "YNY" determination, it may be necessary to calibrate (and determine the position of) the temperature sensing assembly. Some embodiments may provide the user with an error message, e.g. requiring a shut down and restart, and/or servicing and/or replacement of the temperature sensor assembly.

Some embodiments will provide the user with a calibration message on the display of the user interface requesting the removal of any cookware from the cooktop. The cooktop will then analyse the resulting determination as shown in Table 5:

"NNN" indicates normal operation (e.g. for a pot with a concave base) so that the upper receiver 1322 will continue to be used in subsequent operations;

"YNN" indicates aging and movement of the assembly so that the lower receiver 1324 will be relied on moving forward;

"YYN" is an unexpected outcome, and may indicate an error or malfunctioning of the temperature assembly, possibly because the temperature assembly has permanently sunk down to a distance which cannot be distinguished by the sensors. This outcome will result in the appliance prompting the user to service and/or replace the temperature sensor assembly.

Figure 14:
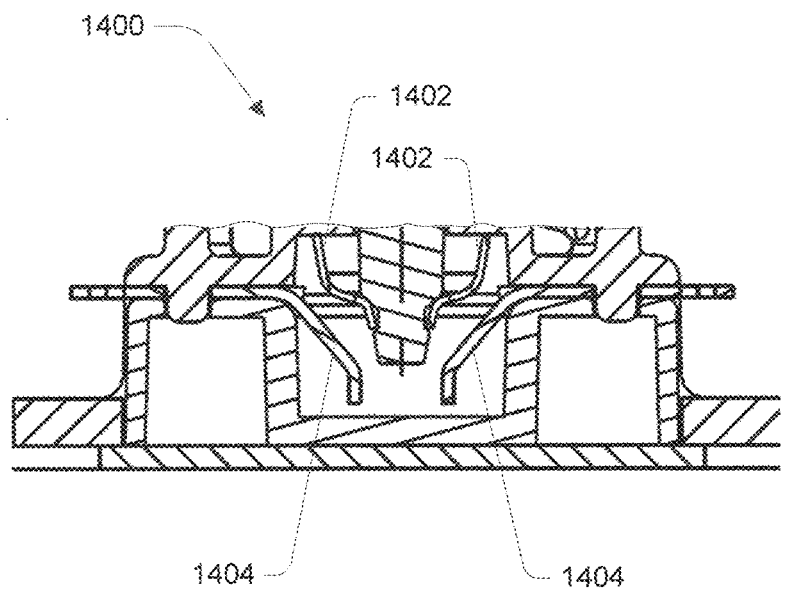
FIG. 14 is a partial cross section of another embodiment of a pot detection system.

In another embodiment, movement of the temperature sensor enables pot detection with the use of an integral switch component. FIG. 14 shows a temperature sensor assembly 1400 with an integral switch component in the form of one or more conductive elements 1402. The conductive elements 1402 move up and down with the temperature sensor 1400 when a cooking vessel is placed on the cooking surface, depressing the temperature sensor 1400.

As the temperature sensor 1400 is moved to a lowered configuration, the conductive elements 1402 electrically engage one or more switch contacts 1404 to complete a circuit there between. Completing this detection circuit provides a detection signal to the controller 204 to indicate the presence of a cooking vessel. Additionally or alternatively, the detection signal is used (typically through a relay or other means of power isolation) to enable power to a heating system only when the temperature sensor is in a lowered configuration.

It will be understood that the invention disclosed and defined in this specification extends to all alternative combinations of two or more of the individual features mentioned or evident from the text or drawings. All of these different combinations constitute various alternative aspects of the invention.

It would be appreciated that, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment.

Thus, one embodiment of each of the methods described herein is in the form of a computer-readable carrier medium carrying a set of instructions, e.g., a computer program that are for execution on one or more processors.

Unless specifically stated otherwise, as apparent from the following discussions, it is appreciated that throughout the specification discussions utilizing terms such as "processing", "computing", "calculating", "determining" or the like, can refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken is included.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Similarly, it is to be noticed that the term "coupled", when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description. Although the invention has been described with reference to specific examples, it will be appreciated by those skilled in the art that the invention may be embodied in many other forms.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The invention claimed is:

1. A cooktop appliance apparatus having a cooking surface for use in cooking, the apparatus including:
   a heating subsystem associated with the cooking surface;
   a controller for controlling operation of the heating subsystem;
   a hardware-implemented safety module comprising two or more electronic safety circuits, each safety circuit having:
      a temperature sensor for sensing a temperature associated with the heating subsystem, and
      a comparator adapted to compare the sensed temperature with a threshold safety temperature, and
      an electronic switch for activating operation of the heating sub-system;
   wherein temperature sensors of the respective safety circuits are located beneath a sensor cap that is biased into a raised position above the cooking surface;
   wherein electronic switches of the respective safety circuits together effect operation of the heating subsystem only when at least two safety circuits determine that the sensed temperature is below a predetermined threshold safety temperature.

2. The apparatus according to claim 1, wherein the safety module is electrically isolated from circuitry driving the heating subsystem.

3. The apparatus according to claim 1, wherein the temperature sensors provide temperature measurements to the controller for used in controlling the heating subsystem.

4. The apparatus according to claim 1, the apparatus further including:
   a user interface adapted to receive a user input with respect to operating parameters of the heating system, the user input including a set temperature;

wherein the controller controls operation of the heating system based on the user selected set temperature and on a heating control mode.

5. The apparatus according to claim 4, wherein the controller selects the heating control mode from one or more predetermined heating control modes based on the user selected set temperature.

6. The apparatus according to claim 4, wherein the heating control mode defines a power level associated with the operation of the heating subsystem.

7. The apparatus according to claim 4, wherein the heating control mode defines a heating rate effected by the heating subsystem.

8. The apparatus according to claim 4, wherein the user selects the heating control mode from one or more predetermined heating control modes, and each of the one or more predetermined heating control modes is indicative of a respective heating rate.

9. The apparatus according to claim 8, wherein each of the one or more predetermined heating control modes is further associated with a respective temperature overshoot.

10. The apparatus according to claim 8, wherein:
the one or more predetermined heating control modes are configured to be separately associated with a selectable temperature range; and
the one or more predetermined heating control modes are configured to be separately associated with a selectable power range.

11. The apparatus according to claim 4, wherein: the user selected set temperature determines a user selected temperature range, and the selected heating control mode is configured for the user selected temperature range.

12. The apparatus according to claim 11, wherein configuration of the selected heating control mode determines a maximum applied power that is a fraction of any predetermined power limit.

13. The apparatus according to claim 12, wherein the selected heating control mode is a default setting.

14. The apparatus according to claim 4, the apparatus further including an external probe temperature sensor coupled to the controller.

15. The application according to claim 1, the apparatus further including:
a fan system for cooling one or more electronic circuitry subsystems; and
a fan controller for controlling operation of the fan system;
wherein the fan controller controls the fan system based on an average power level supplied to the heating system, and based on a temperature measure associated with the one or more subsystems;
a range of the average power level supplied to the heating system is mapped to a first range of fan speeds according to a first mapping, and a range of appliance subsystem temperatures is mapped to a second range of fan speeds according to a second mapping;
the controller controls the fan system by selecting a highest fan speed resulting from both the first mapping and the second mapping.

* * * * *